US012305852B2

(12) United States Patent
Liu et al.

(10) Patent No.: US 12,305,852 B2
(45) Date of Patent: May 20, 2025

(54) COMBUSTIBLE ICE EFFICIENT COMBUSTION SYSTEM

(71) Applicant: GUANGDONG UNIVERSITY OF TECHNOLOGY, Guangzhou (CN)

(72) Inventors: Xiaozhou Liu, Guangzhou (CN); Hao Liang, Guangzhou (CN); Jinghan Yuan, Guangzhou (CN)

(73) Assignee: GUANGDONG UNIVERSITY OF TECHNOLOGY, Guangzhou (CN)

( * ) Notice: Subject to any disclaimer, the term of this patent is extended or adjusted under 35 U.S.C. 154(b) by 515 days.

(21) Appl. No.: 17/878,954

(22) Filed: Aug. 2, 2022

(65) Prior Publication Data

US 2023/0062586 A1 Mar. 2, 2023

Related U.S. Application Data

(63) Continuation of application No. PCT/CN2022/088886, filed on Apr. 25, 2022.

(51) Int. Cl.
*F23D 14/02* (2006.01)
*F17C 13/04* (2006.01)
(Continued)

(52) U.S. Cl.
CPC .............. *F23D 14/02* (2013.01); *F17C 13/04* (2013.01); *F23C 9/00* (2013.01); *F23K 1/04* (2013.01);
(Continued)

(58) Field of Classification Search
CPC .............. F17C 13/04; F17C 2205/0326; F17C 2205/0332; F17C 2205/0352;
(Continued)

(56) References Cited

U.S. PATENT DOCUMENTS 5,414,992 A * 5/1995 Glickstein ............... F02C 7/224 60/39.83
5,540,190 A * 7/1996 Rogers .................... F02B 43/00 123/25 R
(Continued)

FOREIGN PATENT DOCUMENTS

CN 105333449 A 2/2016
CN 106837438 A 6/2017
(Continued)

OTHER PUBLICATIONS

International Search Report of PCT/CN2022/088886, Mailed Jun. 23, 2022.

*Primary Examiner* — Michael G Hoang
*Assistant Examiner* — Logan P Jones

(57) ABSTRACT

A combustible ice efficient combustion system comprises a combustible ice storage unit and a combustion unit, the front end of the furnace of the combustion unit is provided with a combustor, the rear end of the furnace of the combustion unit is connected with a flue gas main pipe, the combustor is provided with a first fuel gas inlet, a second fuel gas inlet, a combustion-supporting gas inlet and a flue gas outlet, the first fuel gas inlet is provided with a combustion nozzle, the combustion nozzle is provided with a first gas inlet, a second gas inlet and a mixed gas outlet, the first gas inlet is connected with the combustible ice storage unit through a high-pressure natural gas pipeline, the second gas inlet is connected with an air source, and the mixed gas outlet is connected with the first fuel gas inlet of the combustor.

10 Claims, 3 Drawing Sheets

(51) Int. Cl.

| | |
|---|---|
| ***F23C 9/00*** | (2006.01) |
| ***F23K 1/04*** | (2006.01) |
| ***F23L 15/04*** | (2006.01) |

(52) U.S. Cl.
CPC ...... *F23L 15/04* (2013.01); *F17C 2205/0326* (2013.01); *F17C 2205/0332* (2013.01); *F17C 2205/0352* (2013.01); *F17C 2221/033* (2013.01); *F17C 2227/0332* (2013.01); *F23C 2202/20* (2013.01)

(58) Field of Classification Search
CPC ........ F17C 2221/033; F17C 2227/0332; F23C 2202/20; F23C 9/00; F23D 14/02; F23D 2900/14021; F23K 1/04; F23K 2203/103; F23K 2400/10; F23K 2900/01041; F23L 15/04
See application file for complete search history.

(56) References Cited

U.S. PATENT DOCUMENTS

| | | | | | |
|---|---|---|---|---|---|
| 5,997,596 | A * | 12/1999 | Joshi | B01J 19/26 | |
| | | | | 239/132.3 | |
| 6,383,462 | B1 * | 5/2002 | Lang | F23C 9/08 | |
| | | | | 423/210 | |
| 7,898,101 | B1 * | 3/2011 | Huber | F02C 7/22 | |
| | | | | 290/2 | |

FOREIGN PATENT DOCUMENTS

| | | | | |
|---|---|---|---|---|
| CN | 112413571 | A | 2/2021 | |
| CN | 113739144 | A | 12/2021 | |
| CN | 216281370 | U | 4/2022 | |
| CN | 216281371 | U | 4/2022 | |
| EP | 1136443 | A1 * | 9/2001 | B01J 12/00 |
| IN | 105840312 | A | 8/2016 | |
| WO | 0060226 | A1 | 10/2000 | |

* cited by examiner

COMBUSTIBLE ICE EFFICIENT COMBUSTION SYSTEM

CROSS-REFERENCE TO RELATED APPLICATIONS

This application is a continuation of International Patent Application No. PCT/CN2022/088886 with a filing date of Apr. 25, 2022, designating the United States, now pending, and further claims priority to Chinese Patent Application No. 202110982803.1 with a filing date of Aug. 25, 2021. The content of the aforementioned applications, including any intervening amendments thereto, are incorporated herein by reference.

TECHNICAL FIELD

The present invention relates to the technical field of combustible ice, and more particularly, to a combustible ice efficient combustion system.

BACKGROUND

In the face of the increasingly severe environmental problems and energy crisis, the whole world is vigorously advocating energy conservation and emission reduction, especially for related industries with severe energy consumption and pollution, and how to carry out transformation on energy conservation and emission reduction has become a factor that those skilled in related art must consider when designing such device.

Combustible ice looks like ice capable of combusting, and is also known as "solid gas" or "vapor ice". The combustible ice is a crystal of natural gas (methane) and water formed under a high pressure at a low temperature. The combustible ice is widely distributed and stored in sediments in a sea area or a frozen soil layer in a land area, has a high resource density, a large reserve volume and wide distribution, has an extremely high mining value, and is an important substitute of low-carbon clean energy in the future.

At present, people make great efforts to generate electricity by using the combustible ice, which effectively avoids the defect that hydro-electricity generation is limited by a geographical location and an environment, the defect of air pollution caused by thermal-electricity generation, the defect of immature technology of nuclear-electricity generation, and the defect of large investment and small outcome of wind-electricity generation.

However, current researches only stop at an electricity generator of the combustible ice, in which a capacity of the combustible ice after decomposition is not systematically and fully used, and there is still a waste of energy.

For example, a combustible ice electricity generation apparatus disclosed in Chinese patent application No. 201811341947.3 comprises a high-temperature combustion chamber, a steam turbine, a decelerator and an asynchronous alternator, wherein the decelerator is built in the steam turbine and arranged on one side of an output end of the steam turbine, the asynchronous alternator is connected to the output end of the steam turbine, one side of the high-temperature combustion chamber is provided with an injection nozzle, steam generated in the high-temperature combustion chamber is directly injected to an input end of the steam turbine through the injection nozzle, so that the steam turbine is driven to be operated to generate power, and after a rotation speed of the steam turbine is regulated through the decelerator, the asynchronous alternator is driven to be operated to generate electricity. However, the combustible ice electricity generation apparatus has the following disadvantages or defects: there is great energy consumption during decomposition of combustible ice.

For another example, a combustible ice electricity generation device disclosed in Chinese patent application No. 201210323240.6 specifically comprises a combustible ice electricity generator and an electric station, wherein a structure of the electric station comprises an engine, which uses compressed natural gas (i.e., CNG) generated by decomposition of combustible ice as fuel, so that the mined combustible ice is directly put into electricity generation, thus improving a utilization rate, needing no transportation, and saving a lot of transportation costs, and moreover, the CNG generated by the combustible ice is pollution-free after combustion, thus achieving environmental protection. However, the combustible ice electricity generation device has the following disadvantages or defects: (1) there is great energy consumption during decomposition of combustible ice; and (2) heat energy generated by combustion of the combustible ice is failed to be fully used, resulting in energy waste.

Therefore, it is an urgent problem to be solved in the industry to provide a combustible ice efficient combustion system capable of reducing energy consumption and pollution, and fully increasing the energy utilization efficiency of the combustible ice at the same time.

SUMMARY

The present invention aims to provide a combustible ice efficient combustion system, which can fully and efficiently use the high-pressure gas generated by decomposition of combustible ice for electricity generation and heat energy generated by combustion of the combustible ice, thus significantly improving an energy utilization rate.

In order to achieve the object above, the present invention provides a combustible ice efficient combustion system, comprising a combustible ice storage unit and a combustion unit, a front end of a furnace of the combustion unit being provided with a combustor, and a rear end of the furnace of the combustion unit being connected with a flue gas main pipe for discharging a high-temperature flue gas, wherein the combustor is provided with a first gaseous fuel inlet, a second gaseous fuel inlet, a combustion-supporting gas inlet and a fuel gas outlet, the first gaseous fuel inlet is provided with a combustion nozzle, the combustion nozzle is provided with a first gas inlet, a second gas inlet, a third gas inlet and a mixed gas outlet, the first gas inlet is connected with the combustible ice storage unit through a high-pressure natural gas pipeline, the second gas inlet is connected with an air source, and the mixed gas outlet is connected with the first gaseous fuel inlet of the combustor; and the high-pressure natural gas pipeline is connected with a natural gas branch pipeline, the natural gas branch pipeline is provided with a gas turbine, the natural gas branch pipeline conveys a high-pressure natural gas accounting for 50% to 60% of the total amount of the high-pressure natural gas in pipeline to the gas turbine for electricity generation, generated electric energy is stored in an electric energy storage device, and the high-pressure natural gas is depressurized by the gas turbine to become a low-pressure natural gas, which is conveyed to the second gaseous fuel inlet of the combustor through a low-pressure natural gas pipeline.

Optionally, the flue gas main pipe is connected with a flue gas branch pipe, and the flue gas branch pipe is communicated with the third gas inlet of the combustion nozzle, so that a high-temperature flue gas accounting for 10% to 30% of the total amount of the flue gas in main pipe is injected into the combustion nozzle, mixed with air and the high-pressure natural gas, and then sent to the furnace of the combustion unit for combustion.

Optionally, the combustor comprises an inner cylinder and an outer cylinder which are coaxial, front ends of the inner cylinder and the outer cylinder are sealed, rear ends of the inner cylinder and the outer cylinder are the combustion gas outlets, which are connected with the furnace of the combustion unit, the first gaseous fuel inlet is arranged in an upper side wall at the front end of the outer cylinder, the combustion-supporting gas inlet is arranged in a lower side wall at the front end of the inner cylinder, and the second gaseous fuel inlet is arranged at the front end of the inner cylinder.

The first gaseous fuel inlet is arranged in the upper side wall at the front end of the outer cylinder, so that the high-pressure natural gas, the high-temperature flue gas and the air tangentially enter the combustor, and form a swirling flow in the outer cylinder of the combustor, thus enhancing the mixing of the three gases. Meanwhile, the combustion-supporting gas inlet is arranged in the lower side wall at the front end of the inner cylinder, so that the low-pressure natural gas entering from the front end of the inner cylinder is more uniformly mixed with a combustion-supporting gas tangentially entering the inner cylinder.

Optionally, the combustible ice storage unit comprises a plurality of heating devices, a combustible ice container placed in each heating device, a shared pipe connected with a gas outlet of the combustible ice container, and a gas storage tank connected with an outlet of the shared pipe.

Optionally, the heating device is a water jacket provided with a hot water inlet and a cold water outlet, and the hot water inlet and the cold water outlet between two adjacent water jackets are connected through a pipeline.

Optionally, the combustible ice efficient combustion system further comprises a first heat exchanger, wherein the first heat exchanger comprises a high-temperature flue gas inlet, a medium-temperature flue gas outlet, a cold air inlet and a hot air outlet, the high-temperature flue gas inlet is connected with the flue gas main pipe, and the hot air outlet is connected with the combustion-supporting gas inlet of the combustor through a hot air pipeline.

The high-temperature flue gas at 800° C. to 1,300° C. from the furnace of the combustion unit is discharged to the flue gas main pipe, and the high-temperature flue gas accounting for 10% to 30% of a total amount of the high-temperature flue gas is injected back into the combustor, mixed with the high-pressure natural gas and air, and then combusted, thus effectively increasing a furnace temperature and maintaining a stability of a combustion temperature; and 70% to 90% of the total amount of the high-temperature flue gas enters the first heat exchanger and transfers heat to the cold air at 20° C. to 25° C., and then formed hot air at 500° C. to 800° C. enters the combustor, is mixed with the low-pressure natural gas, and then enters the combustion unit for combustion, thus further improving the combustion efficiency of the low-pressure natural gas.

Optionally, the combustible ice efficient combustion system further comprises a second heat exchanger, wherein the second heat exchanger comprises a medium-temperature flue gas inlet, a low-temperature flue gas outlet, a cold water inlet and a hot water outlet, the medium-temperature flue gas inlet is connected with the medium-temperature flue gas outlet of the first heat exchanger, the low-temperature flue gas outlet is connected with a chimney through a low-temperature flue gas pipeline, the cold water inlet is connected with the cold water outlet of the water jacket at the tail end of the combustible ice storage unit, and the hot water outlet is connected with the hot water inlet of the water jacket at the head end of the combustible ice storage unit.

The medium-temperature flue gas at 300° C. to 400° C. from the first heat exchanger enters the second heat exchanger and exchanges heat with cold water at 30° C. to 40° C. discharged from the water jacket at the tail end of the combustible ice storage unit, and then formed hot water at 80° C. to 90° C. enters the hot water inlet of the water jacket at the head end of the combustible ice storage unit, thus completing the heating of all combustible ice containers, and formed cold flue gas at 180° C. to 200° C. after heat exchange is discharged to the chimney.

Optionally, a combustible ice connecting pipeline between the gas outlet of each combustible ice container and the shared pipe is provided with a pressure relief valve, and a shared pipe connecting pipeline between the outlet of the shared pipe and the gas storage tank is provided with an electric regulating valve.

Preferably, each combustible ice connecting pipeline is also provided with a gas flowmeter to monitor the flow rate of the high-pressure natural gas discharged from the combustible ice container in real time, and when no high-pressure natural gas is discharged from one combustible ice container, a new combustible ice container may replace the combustible ice container immediately.

Optionally, the hot air pipeline is provided with a first fan to introduce hot air into the combustion-supporting gas inlet, and the low-temperature flue gas pipeline is provided with a second fan to introduce a low-temperature flue gas into the chimney.

Optionally, the first fan, the second fan, the pressure relief valve and the electric regulating valve are electrically connected with the electric energy storage device respectively to acquire electric energy.

The present invention has the beneficial effects as follows: (1) a number of the combustible ice containers may be adjusted according to requirements, so as to control an amount of the electric energy generated, without causing unnecessary waste; (2) the combustion system is pollution-free, and the hot air generated by the heat exchange of the high-temperature flue gas with the cold air may be used for combustion again, which not only effectively utilizes heat of the high-temperature flue gas and the hot air, but also improves a combustion efficiency; (3) a part of the high-temperature flue gas is injected to the nozzle to be mixed with air for combustion supporting, which not only effectively recycles the hot flue gas, but also reduces a discharge amount of the flue gas and a generation amount of nitrogen oxide, thus realizing energy conservation and environmental protection; and (4) heat of the middle-temperature flue gas is used for heat exchange with cold water, and generated hot water is used for heating the combustible ice, thus realizing recycling of energy, saving energy and being efficient.

DETAILED DESCRIPTION

Figure 1:
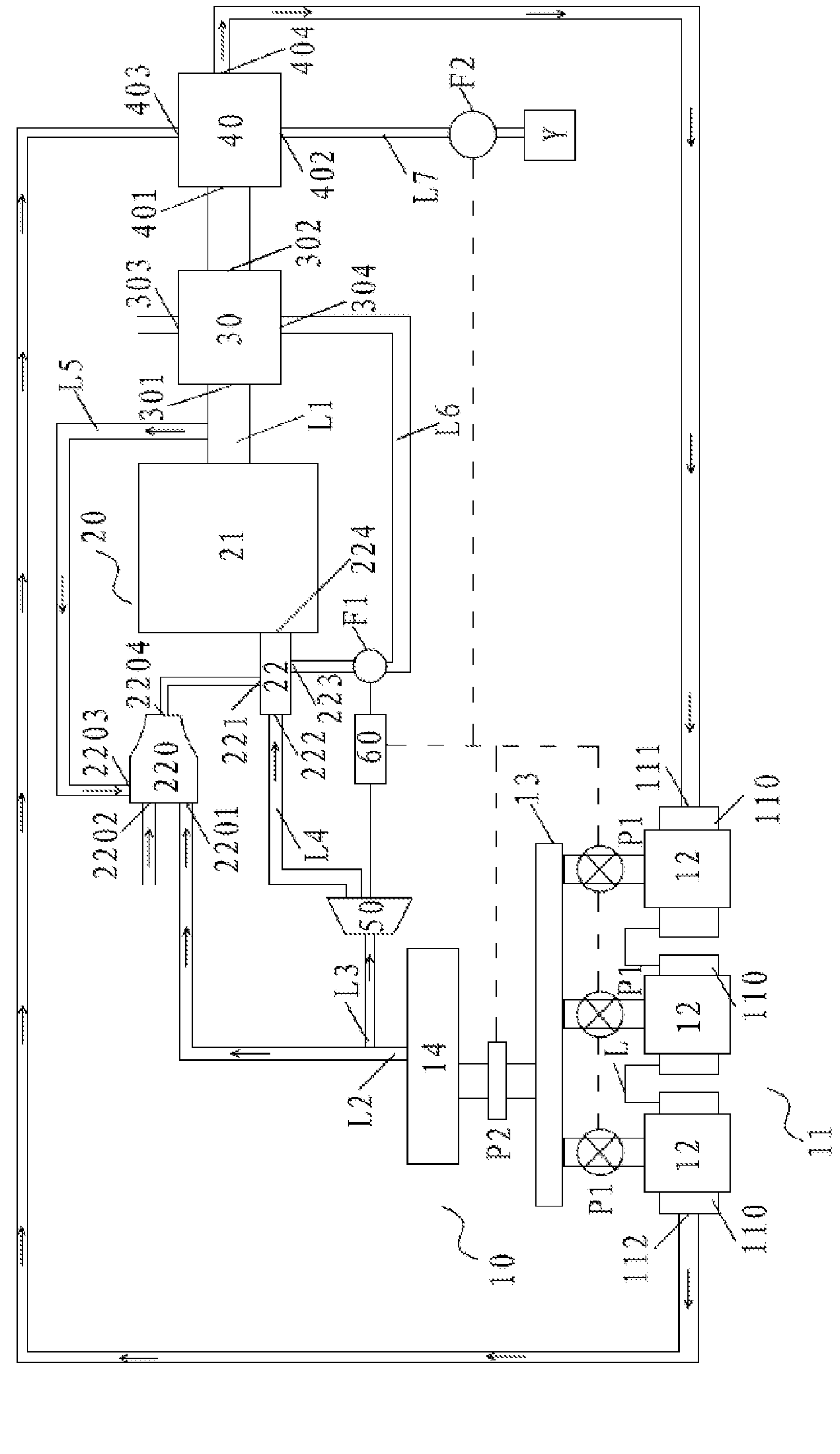
FIG. 1 is a schematic structural diagram of a combustible ice efficient combustion system of the present invention.

The embodiments of the present invention will be described in detail hereinafter. Examples of the embodiments are shown in the accompanying drawings. The same or similar reference numerals throughout the drawings denote the same or similar elements or elements having the same or similar functions. The embodiments described below with reference to the accompanying drawings are exemplary and are intended to explain the present invention, but should not be construed as limiting the present invention.

With reference to FIG. 1, as a non-limiting embodiment, a combustible ice efficient combustion system of the present invention comprises a combustible ice storage unit 10, a combustion unit 20, a first heat exchanger 30 and a second heat exchanger 40.

A front end of a furnace 21 of the combustion unit 20 is provided with a combustor 22, and a rear end of the furnace 21 of the combustion unit 20 is connected with a flue gas header pipe L1 for discharging a high-temperature flue gas.

As shown in FIG. 1, the combustor 22 is provided with a first gaseous fuel inlet 221, a second gaseous fuel inlet 222, a combustion-supporting gas inlet 223 and a combustion gas outlet 224. The first gaseous fuel inlet 221 is provided with a combustion nozzle 220, the combustion nozzle 220 is provided with a first gas inlet 2201, a second gas inlet 2202, a third gas inlet 2203 and a mixed gas outlet 2204. The first gas inlet 2201 is connected with the combustible ice storage unit 10 through a high-pressure natural gas pipeline L2, the second gas inlet 2202 is connected with an air source, and the mixed gas outlet 2204 is connected with the first gaseous fuel inlet 221 of the combustor 22. The combustion nozzle 220 has an injector structure, which uses a pressure of the high-pressure natural gas entering the first gas inlet 2201 to form a suction force, and sucks air into the combustion nozzle 220 through the second gas inlet 2202. It is unnecessary to provide other power during this process, thus being more energy-saving.

The high-pressure natural gas pipeline L2 is connected with a natural gas branch pipeline L3, and the natural gas branch pipeline L3 is provided with a gas turbine 50. The natural gas branch pipeline L3 conveys a high-pressure natural gas accounting for 50% to 60% of the amount of the high-pressure natural gas in pipeline L2 to the gas turbine 50 for electricity generation, generated electric energy is stored in an electric energy storage device 60, and the high-pressure natural gas is depressurized by the gas turbine 50 to become a low-pressure natural gas, which is conveyed to the second gaseous fuel inlet 222 of the combustor 22 through a low-pressure natural gas pipeline L4.

In the non-limiting embodiment, the flue gas main pipe L1 is connected with a flue gas branch pipe L5, and the flue gas branch pipe L5 is connected with the third gas inlet 2203 of the combustion nozzle 220. Similarly, since the combustion nozzle 220 has an injector structure, which uses a pressure of the high-pressure natural gas entering the first gas inlet 2201 to form a suction force, a high-temperature flue gas accounting for 10% to 30% of the amount of the flue gas in main pipe L1 may be injected into the combustion nozzle 220, mixed with air and the high-pressure natural gas, and then sent to the furnace 21 of the combustion unit 20 for combustion.

Figure 2:
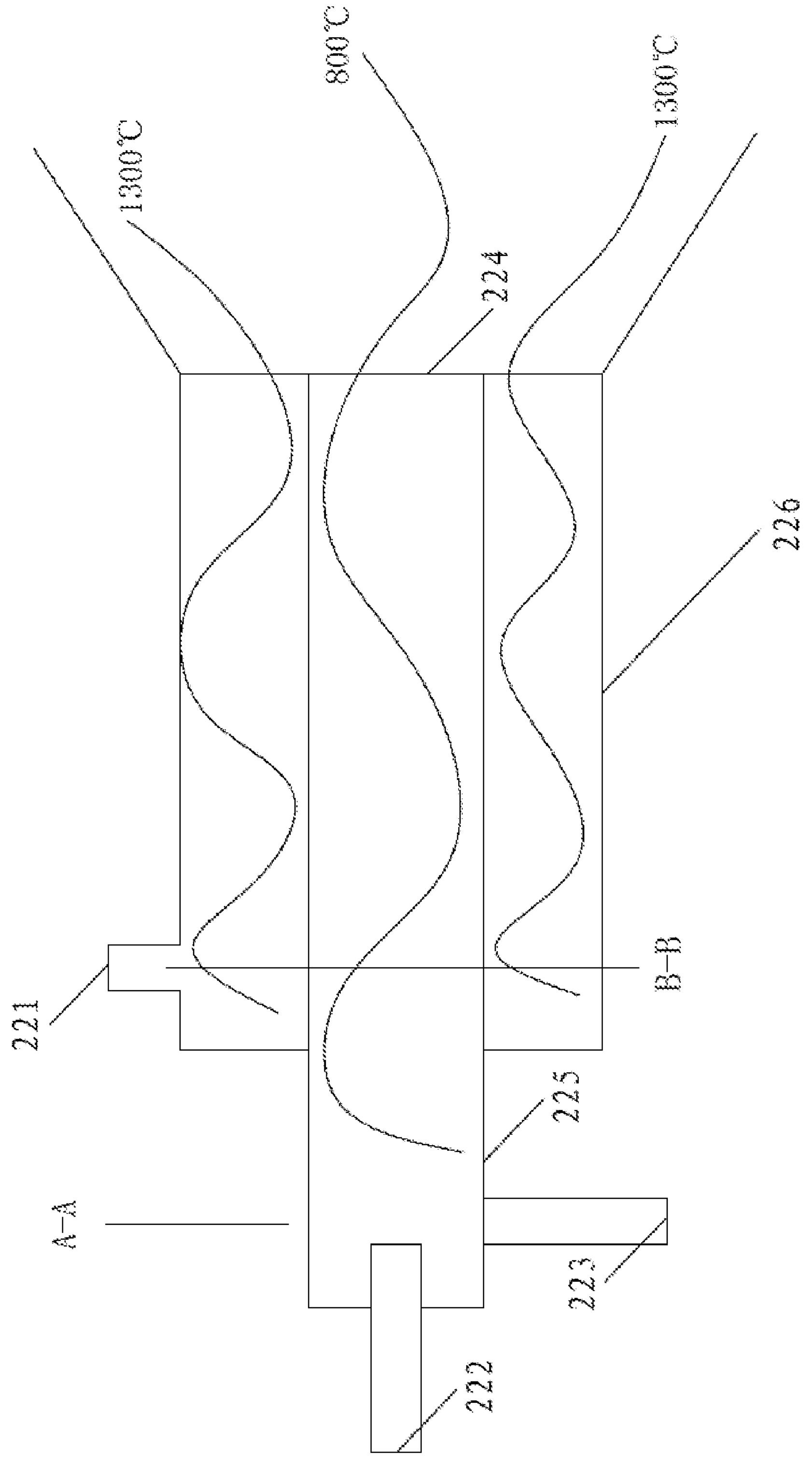
FIG. 2 is a schematic structural diagram of a combustor of the present invention.

As another non-limiting embodiment, as shown in FIG. 2, the combustor 22 comprises an inner cylinder 225 and an outer cylinder 226 which are coaxial. Front ends of the inner cylinder 225 and the outer cylinder 226 are sealed, and rear ends of the inner cylinder 225 and the outer cylinder 226 are the combustion gas outlets 224, which are connected with the furnace 21 of the combustion unit 20. The first gaseous fuel inlet 221 is arranged in an upper side wall at the front end of the outer cylinder 226, the combustion-supporting gas inlet 223 is arranged in a lower side wall at the front end of the inner cylinder 225, and the second gaseous fuel inlet 222 is arranged at the front end of the inner cylinder 225.

Figure 3:
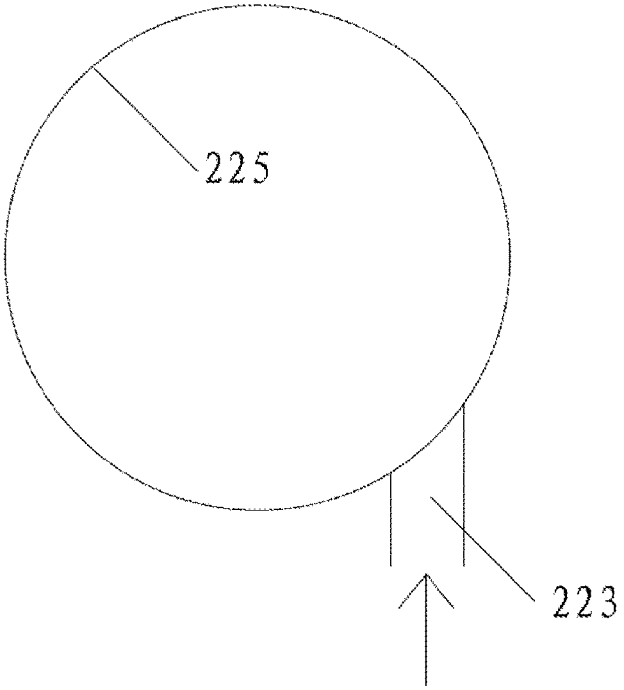
FIG. 3 is a schematic diagram of an A-A cross section of FIG. 2.
Figure 4:
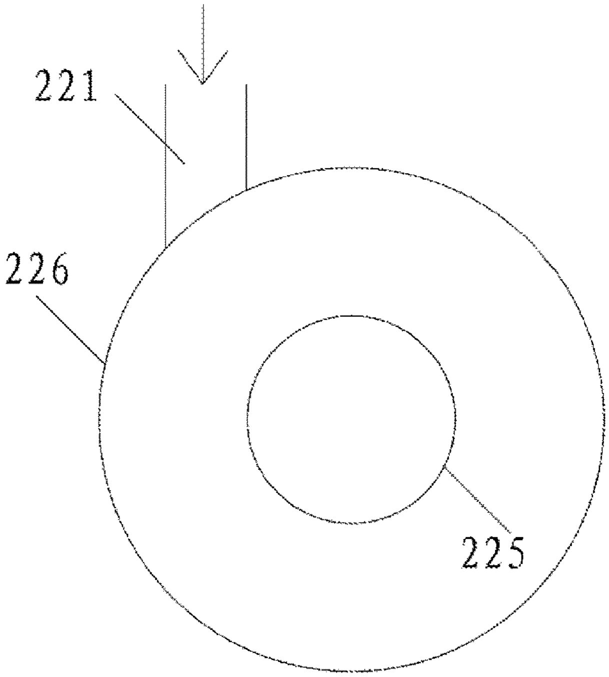
FIG. 4 is a schematic diagram of a B-B cross section of FIG. 2.

Thus, it can be seen that, as shown in FIG. 3, the combustion-supporting gas inlet 223 is arranged in the lower side wall at the front end of the inner cylinder 225, so that the low-pressure natural gas entering from the front end of the inner cylinder 225 is more uniformly mixed with a combustion-supporting gas tangentially entering the inner cylinder, and a combustion temperature can reach about 800° C. Meanwhile, as shown in FIG. 4, the first gaseous fuel inlet 221 is arranged in the upper side wall at the front end of the outer cylinder 226, so that the high-pressure natural gas, the high-temperature flue gas and the air tangentially enter the combustor 22, and form a swirling flow in the outer cylinder 226 of the combustor 22, thus enhancing the mixing of the three gases, and enabling the combustion temperature to reach about 1,300° C.

As another non-limiting embodiment, as shown in FIG. 1, the first heat exchanger 30 comprises a high-temperature flue gas inlet 301, a medium-temperature flue gas outlet 302, a cold air inlet 303 and a hot air outlet 304. The high-temperature flue gas inlet 301 is connected with the flue gas main pipe L1, and the hot air outlet 304 is connected with the combustion-supporting gas inlet 223 of the combustor 22 through a hot air pipeline L6.

Therefore, the high-temperature flue gas at 800° C. to 1,300° C. from the furnace 21 of the combustion unit 20 is discharged to the flue gas main header pipe L1, and the high-temperature flue gas accounting for 10% to 30% of a total amount of the high-temperature flue gas is injected back into the combustor 22 through the flue gas branch pipeline L5, mixed with the high-pressure natural gas and air, and then combusted, thus effectively increasing a furnace temperature and maintaining a stability of the combustion temperature. 70% to 90% of the amount of the high-temperature flue gas enters the first heat exchanger 30 and exchanges heat with cold air at 20° C. to 25° C., and then formed hot air at 500° C. to 800° C. enters the combustor 22 through the hot air pipeline L6, is mixed with the low-pressure natural gas, and then enters the combustion unit 20 for combustion, thus further improving a combustion efficiency of the low-pressure natural gas.

As another non-limiting embodiment, as shown in FIG. 1, the combustible ice storage unit 10 comprises a plurality of heating devices 11, a combustible ice container 12 placed in each heating device 11, a shared pipe 13 connected with a gas outlet of the combustible ice container 12, and a gas storage tank 14 connected with an outlet of the shared pipe 13.

In the non-limiting embodiment, as shown in FIG. 1, the heating device 11 is a water jacket 110 provided with a hot water inlet 111 and a cold water outlet 112, and the hot water inlet 111 and the cold water outlet 112 between two adjacent water jackets 110 are connected through a pipeline L.

As shown in FIG. 1, the second heat exchanger 40 comprises a medium-temperature flue gas inlet 401, a low-temperature flue gas outlet 402, a cold water inlet 403 and a hot water outlet 404. The medium-temperature flue gas inlet 401 is connected with the medium-temperature flue gas outlet 302 of the first heat exchanger 30, the low-temperature flue gas outlet 402 is connected with a chimney Y through a low-temperature flue gas pipeline L7, the cold water inlet 403 is connected with the cold water outlet 112 of the water jacket 110 at a tail end of the combustible ice storage unit 10, and the hot water outlet 404 is connected with the hot water inlet 111 of the water jacket at a head end of the combustible ice storage unit 10.

Therefore, the medium-temperature flue gas at 300° C. to 400° C. from the first heat exchanger enters the second heat exchanger 40 and exchanges heat with cold water at 30° C. to 40° C. discharged from the water jacket 110 at the tail end of the combustible ice storage unit 10, and then formed hot water at 80° C. to 90° C. enters the hot water inlet 111 of the water jacket 110 at the head end of the combustible ice storage unit 10, thus completing the heating of all combustible ice containers 12, and formed cold flue gas at 180° C. to 200° C. after heat exchange is discharged to the chimney Y through the low-temperature flue gas pipeline L7.

In the non-limiting embodiment, as shown in FIG. 1, a combustible ice connecting pipeline (not marked in the drawing) between the gas outlet of each combustible ice container 12 and the shared pipe 13 is provided with a pressure relief valve P1, and a shared pipe connecting pipeline (not marked in the drawing) between the outlet of the shared pipe 13 and the gas storage tank 14 is provided with an electric regulating valve P2. The hot air pipeline L6 is provided with a first fan F1, and the low-temperature flue gas pipeline L7 is provided with a second fan F2. The first fan F1, the second fan F2, the pressure relief valve P1 and the electric regulating valve P2 are electrically connected with the electric energy storage device (not shown in the drawing) respectively to acquire electric energy, thus realizing closed loop use of energy.

In the descriptions of the specification, the descriptions with reference to the terms "one embodiment", "some embodiments", "example", "specific example" or "some examples", etc., refer to that specific features, structures, or characteristics described with reference to the embodiments or examples are included in at least one embodiment or example of the present invention. In the specification, the schematic representation of the above terms does not necessarily refer to the same embodiment or example. In addition, in the case of having no mutual contradiction, those skilled in the art may join and combine different embodiments or examples described in the specification and the characteristics of the different embodiments or examples.

Although the embodiments of the present invention have been shown and described above, it may be understood that the above embodiments are exemplary and cannot be understood as limiting the present invention, and those of ordinary skills in the art may make changes, modifications, substitutions and variations to the above embodiments within the scope of the present invention.

The invention claimed is:

1. A combustible ice efficient combustion system, comprising a combustible ice storage unit and a combustion unit, the front end of a furnace of the combustion unit being provided with a combustor, and the rear end of the furnace of the combustion unit being connected with a flue gas main pipe for discharging a high-temperature flue gas, wherein:

the combustor is provided with a first gaseous fuel inlet, a second gaseous fuel inlet, a combustion-supporting gas inlet and a flue gas outlet, the first gaseous fuel inlet is provided with a combustion nozzle, the combustion nozzle is provided with a first gas inlet, a second gas inlet, a third gas inlet and a mixed gas outlet, the first gas inlet is connected with the combustible ice storage unit through a high-pressure natural gas pipeline, the second gas inlet is connected with an air source, and the mixed gas outlet is connected with the first gaseous fuel inlet of the combustor; and the high-pressure natural gas pipeline is connected with a natural gas branch pipeline, the natural gas branch pipeline is provided with a gas turbine, the natural gas branch pipeline conveys a high-pressure natural gas accounting for 50% to 60% of the total amount of the high-pressure natural gas in pipeline to the gas turbine for electricity generation, the generated electric energy is stored in an electric energy storage device, and the high-pressure natural gas is depressurized by the gas turbine to become a low-pressure natural gas, which is conveyed to the second gaseous fuel inlet of the combustor through a low-pressure natural gas pipeline.

2. The combustible ice efficient combustion system according to claim 1, wherein the flue gas main pipe is connected with a flue gas branch pipe, and the flue gas branch pipe is connected with the third gas inlet of the combustion nozzle, so that a high-temperature flue gas accounting for 10% to 30% of the total amount of the flue gas in main pipe is injected into the combustion nozzle, mixed with air and the high-pressure natural gas, and then sent to the furnace of the combustion unit for combustion.

3. The combustible ice efficient combustion system according to claim 2, wherein the combustor comprises an inner cylinder and an outer cylinder which are coaxial, front ends of the inner cylinder and the outer cylinder are sealed, rear ends of the inner cylinder and the outer cylinder are the combustion gas outlets, the combustion gas outlets are connected with the furnace of the combustion unit, the first gaseous fuel inlet is arranged in an upper side wall at the front end of the outer cylinder, the combustion-supporting gas inlet is arranged in a lower side wall at the front end of the inner cylinder, and the second gaseous fuel inlet is arranged at the front end of the inner cylinder.

4. The combustible ice efficient combustion system according to claim 3, wherein the combustible ice storage unit comprises a plurality of heating devices, a combustible ice container placed in each heating device, a shared pipe connected with a gas outlet of the combustible ice container, and a gas storage tank connected with an outlet of the shared pipe.

5. The combustible ice efficient combustion system according to claim 4, wherein the heating device is a water jacket provided with a hot water inlet and a cold water outlet, and the hot water inlet and the cold water outlet between two adjacent water jackets are connected through a pipeline.

6. The combustible ice efficient combustion system according to claim 5, further comprising a first heat exchanger, wherein the first heat exchanger comprises a high-temperature flue gas inlet, a medium-temperature flue gas outlet, a cold air inlet and a hot air outlet, the high-temperature flue gas inlet is connected with the flue gas main pipe, and the hot air outlet is connected with the combustion-supporting gas inlet of the combustor through a hot air pipeline.

7. The combustible ice efficient combustion system according to claim 5, further comprising a second heat exchanger, wherein the second heat exchanger comprises a medium-temperature flue gas inlet, a low-temperature flue gas outlet, a cold water inlet and a hot water outlet, the medium-temperature flue gas inlet is connected with the medium-temperature flue gas outlet of the first heat exchanger, the low-temperature flue gas outlet is connected with a chimney through a low-temperature flue gas pipeline, the cold water inlet is connected with the cold water outlet of the water jacket at the tail end of the combustible ice storage unit, and the hot water outlet is connected with the hot water inlet of the water jacket at the head end of the combustible ice storage unit.

8. The combustible ice efficient combustion system according to claim 6, wherein a combustible ice connecting pipeline between the gas outlet of each combustible ice container and the shared pipe is provided with a pressure relief valve, and the shared pipe connecting pipeline between the outlet of the shared pipe and the gas storage tank is provided with an electric regulating valve.

9. The combustible ice efficient combustion system according to claim 8, wherein the hot air pipeline is provided with a first fan to introduce hot air into the combustion-supporting gas inlet, and the low-temperature flue gas pipeline is provided with a second fan to introduce a low-temperature flue gas into the chimney.

10. The combustible ice efficient combustion system according to claim 9, wherein the first fan, the second fan, the pressure relief valve and the electric regulating valve are electrically connected with the electric energy storage device respectively to acquire electric energy.

* * * * *